(12) United States Patent
Gruchala et al.

(10) Patent No.: US 7,548,197 B2
(45) Date of Patent: Jun. 16, 2009

(54) GPS PARASITE SYSTEM

(75) Inventors: Carol Shilrin Gruchala, Naperville, IL (US); Wayne Robert Heinmiller, Elgin, IL (US); Dianna Inara Tiliks, Palatine, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 241 days.

(21) Appl. No.: 11/158,311

(22) Filed: Jun. 20, 2005

(65) Prior Publication Data

US 2006/0284766 A1 Dec. 21, 2006

(51) Int. Cl.
*G01S 1/00* (2006.01)
(52) U.S. Cl. ................................. 342/357.09
(58) Field of Classification Search ................. 342/357, 342/357.09; 345/716
See application file for complete search history.

(56) References Cited

U.S. PATENT DOCUMENTS

| | | | |
|---|---|---|---|
| 6,563,430 B1 * | 5/2003 | Kemink et al. ......... | 340/825.49 |
| 6,725,051 B2 | 4/2004 | Fidler | |
| 6,836,645 B2 | 12/2004 | Hilgers et al. | |
| 6,850,252 B1 * | 2/2005 | Hoffberg ..................... | 715/716 |
| 2003/0050737 A1 * | 3/2003 | Osann, Jr. ................... | 700/276 |
| 2003/0199280 A1 | 10/2003 | Shih | |
| 2004/0012620 A1 * | 1/2004 | Buhler et al. ............... | 345/716 |
| 2004/0147221 A1 | 7/2004 | Sheynblat et al. | |
| 2004/0174296 A1 * | 9/2004 | Farmer .................. | 342/357.06 |
| 2004/0204831 A1 | 10/2004 | Pochuev et al. | |
| 2005/0055472 A1 * | 3/2005 | Krzyzanowski et al. ........ | 710/5 |
| 2006/0080408 A1 * | 4/2006 | Istvan et al. ................. | 709/219 |

* cited by examiner

*Primary Examiner*—Thomas H Tarcza
*Assistant Examiner*—Harry Liu
(74) *Attorney, Agent, or Firm*—Brinks Hofer Gilson & Lione

(57) ABSTRACT

A non-GPS capable stationary device and method thereof is presented that permits the stationary device to receive location and time information from a mobile, GPS capable device using a non-GPS wireless protocol. This permits the stationary device to make use of the location information in combination with other information from the stationary device, communicated from the mobile device and/or communicated from other devices in a network of devices connected to the stationary device, to customize features of the stationary device accordingly. The stationary device is activated through an external trigger or automatically through an internal trigger.

11 Claims, 4 Drawing Sheets

GPS PARASITE SYSTEM

FIELD OF THE INVENTION

The invention relates to a system and method for providing location information from GPS signals to devices that do not contain electronics for receiving the GPS signals.

BACKGROUND

Systems to locate mobile electronic devices are known generally as RTLS (Real Time Location Systems). One well-known example of RTLS technology is GPS (Global Positioning System) based technology. GPS is a satellite navigational system formed by 24 satellites orbiting the earth and corresponding earth-bound receivers on the earth. The GPS satellites continuously transmit digital radio signals that contain data on the satellites location and the exact time, determined by atomic clocks, to the receivers. Based on this information the receivers know the length of time it takes for the signal to reach the receiver and thus the distance of the satellite from the receiver. By calculating the distance to the satellite, the receiver determines that it is on the surface of an imaginary sphere centered at the satellite. Using three satellites, the GPS receiver can calculate its longitude and latitude based on where the three spheres intersect. Using four satellites, the GPS receiver can also determine its altitude.

The GPS receiver contains multiple electronic components, as well as an antenna for receiving the GPS signal. Until recently, GPS receivers were relatively large and expensive devices, which were used independently of other mobile electronic devices. The size of a typical large GPS receiver is on the order of over 100 cm$^2$ and the cost ranges from a few hundred dollars to a few thousand dollars. This makes a large GPS receiver unable to be used in typical mobile electronic devices, for example, whose sizes are about equal to or smaller than the large GPS receiver and whose costs are usually substantially less than the GPS receiver.

With recent advances in electronics and antennas, however, the size and cost of the GPS receiver have been reduced dramatically. GPS receivers are now able to be incorporated into mobile electronic devices, as the cost has been reduced to about $50 or less. This is relatively inexpensive compared to the overall cost of the device. Examples of mobile electronic devices which have incorporated GPS receivers include laptop computers, cellular phones, and hand held personal digital assistants ("PDA"). However, although mobile electronic devices may incorporate such small, inexpensive GPS receivers often have problems receiving GPS signals indoors, unlike the larger, more expensive GPS receivers.

Thus, with indoor use of GPS receivers, cost and size problems exist with larger GPS antennas and more sophisticated GPS components. Similarly, with indoor use of GPS receivers, reception problems exist with smaller GPS antennas and less complex GPS components.

DETAILED DESCRIPTION

Figure 1:
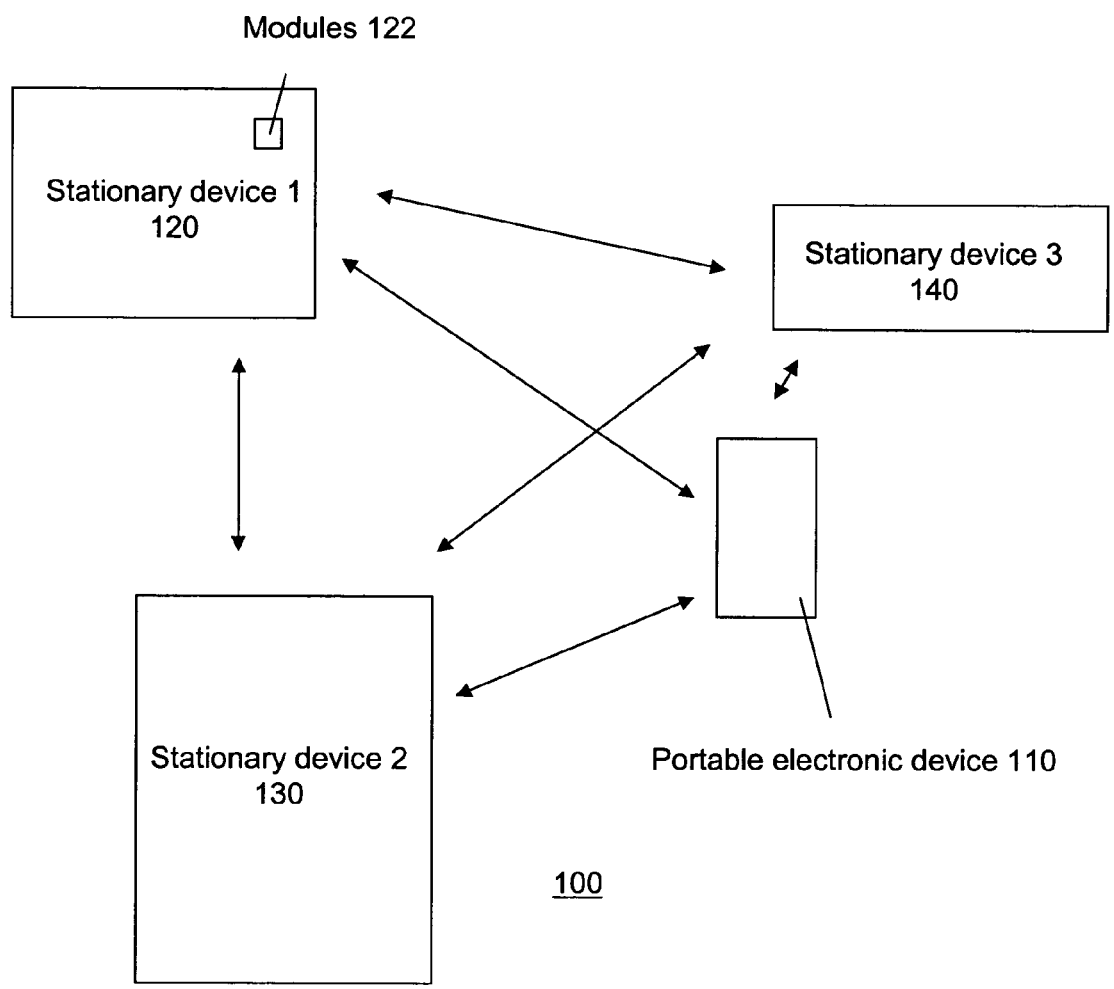
FIG. 1 is a block diagram of a communication system.

A system and method are provided in which non-mobile, indoor devices make use of GPS information to be able to provide localized information. The home devices include electronic devices such as set-top boxes and radio receivers, as well as appliances such as washing machines and coffee makers. The present system and method use existing wireless communication methods to interrogate a mobile electronic device that has a GPS receiver to obtain the GPS information. Although in this application, GPS communications will be discussed, other RTLS (Real Time Location Systems) signals may be used instead.

Many different technologies that permit electronic devices to communicate with each other are currently in existence. Besides signals that are passed through cables, multiple wireless communication standards have been developed. These wireless communication systems are able to be used both inside and outside structures (indoors and outdoors) and permit communications over various distances. Examples of such wireless communication systems include optical-based communication, such as infrared ("IR") signals, or other electromagnetic based communications, such as radio frequency ("RF") signals.

The wireless technologies developed can operate over different ranges: short, medium, or long range. For example, short-range IR technologies have a range of about 3 meters, while short-range RF technologies, such as Bluetooth, at 2.45 GHz, have a range of about 10 meters. The operable range of the wireless communications systems is generally determined by the power of the transmitted signals. Wireless local area network ("WLAN") and other WiFi (wireless fidelity) communication systems use medium range communications of several tens to hundreds of meters while cellular telephones use long range communications of up to several tens of kilometers.

One of the benefits of these alternative wireless technologies is that IR and RF communication methods have been well developed and the transmitter/receiver devices are small and inexpensive. Both IR and RF are particularly useful for indoor communication systems. For example, IR is a "line of sight" technology. That is, the mobile electronic device and the target device have to be correctly oriented to enable communications between the devices. Because IR transmitters and receivers have to be lined up with each other to communicate, not only is interference between devices unlikely, but in addition, information transmitted by one device is received by only the intended target device. RF technologies, on the other hand, may be more susceptible to interference, but are not required to be properly oriented to provide information between devices. In addition, using RF communications, multiple devices may communicate relatively simultaneously.

As discussed, cost, size, and reception problems exist for mobile electronic devices containing different types of GPS receivers. For example, GPS signals, which are relatively weak to begin with, are substantially attenuated inside structures such as houses and office buildings. In addition, while mobile electronic devices may be able to obtain the most benefit of GPS, other devices may also be able to make use of GPS technologies. For example, many non-mobile indoor devices such as set-top boxes and appliances may use of location information to enhance their operation. However, similar cost, size, and reception difficulties may also make the use of GPS signals by the non-mobile indoor devices problematic.

Accordingly, as shown in FIG. 1, a communications system 100 that provides GPS information to one or more stationary devices 120, 130, 140 is provided. The communications system 100 includes a mobile electronic device 110 and one or more stationary devices 120, 130, 140. The stationary devices 120, 130, 140 may be standalone devices that are isolated from other stationary devices or, as shown in FIG. 1, may be connected in a network so as to be in communication with other stationary devices via wireless communication or wired communication. The stationary devices 120, 130, 140 contain one or more modules 122 that execute functions described below and contain tables of information indexed by location. One or more of the modules 122 may additionally indicate a status of location information, e.g. one or more LEDs that glow red if no location information is present, blink if location information is being received/processed, and glow green if location information is present.

The mobile electronic device 110 can be, for example, a cellular phone or PDA (personal digital assistant). The mobile electronic device 110 has the ability to receive GPS signals while the stationary devices 120, 130, 140 do not have the ability to receive GPS signals. However, the stationary devices 120, 130, 140 query the mobile electronic device 110 using non-GPS wireless communications to thereby obtain either exact or approximate location information. Because IR and RF receivers are small and inexpensive, it is relatively easy to incorporate such components into the stationary devices 120, 130, 140.

As used herein, the term "stationary device" includes devices that are not intended to be carried around by an individual while operating. In various examples, stationary devices are set-top boxes, appliances, or other similar devices that are located in a structure that contains people while operating. The term "mobile electronic device" includes electronic devices that are intended to be carried around by an individual while operating. Mobile electronic devices may or may not be used inside or outside structures. Additionally, it will be understood that an electronic device provides voice, video and/or data communication, such as a telephone, a cordless telephone, a mobile phone, a cellular telephone, or a PDA.

Although in one embodiment, the mobile electronic device 110 may contain a GPS receiver that is able to receive GPS signals adequately enough to determine its location inside of various structures, the mobile electronic device 110 may instead contain an inexpensive GPS receiver that is unable to determine the location of the mobile electronic device 110 when the mobile electronic device 110 is in the structure.

In this latter case, the mobile electronic device 110 retains information about its most recent position when data was last received. That is, the location information obtained by the stationary devices 120, 130, 140 may identify the location where the mobile electronic device 110 was last outdoors (e.g., the front door of a house or apartment or office building). This means that the location information acquired by the stationary devices 120, 130, 140 is not accurate enough to locate the device at specific locations within the structure. In this case, the location information is not able to be used to locate the mobile electronic device 110 relative to the various stationary devices 120, 130, 140.

In this case the location information can be used by the stationary devices 120, 130, 140 for global location features (city, county, state, time zone, etc.). In general, however this may be sufficient for the stationary devices 120, 130, 140 such as set-top boxes, stereo components or appliances to achieve the beneficial aspects of location. The stationary devices 120, 130, 140 may be able to select from multiple different sets of data to determine the appropriate set of data to use without having to be set manually.

In one example, a person has a PDA with GPS capabilities, that is, contains stored location information. The person has a set-top box or some similar equipment that controls distribution of entertainment to a television or other display. A weather advisory or some other alert/warning is being broadcast from a television station for several different counties. The set-top box receives the location information from the PDA through wireless communication and customizes the display so that the television displays only the advisory for the particular county, town, portion of the city, or neighborhood in which the set-top box is located. In other examples, the identity and status of seating at local venues such as movie theaters or restaurants can be displayed. As used herein, the term "set-top box" includes any device that converts and displays data from analog cable, digital cable, or digital broadcast television to a standard frequency (channel number) for display on a television set, or a box that receives an off-air digital television signal for display on a monitor.

In another example of using the customized display, if the user has children who go to school and some of the schools in the local area are closed due to inclement weather during the winter, only those school closings in closest proximity to the user are displayed. This saves the user time as the user no longer has to wait while a large number of school closings over a big area slowly scroll across the display. Similarly, a community information channel could be customized to list the lunch menu for the local elementary/middle/high school, instead of listing menus for all schools within the cable system area.

In another example, after various electronic devices are purchased they are manually set with the time, date, etc . . . when installing the device. These electronic devices, when initially plugged into power, can scan for a wireless communication signal. If the particular signal is found within a predetermined time period, the electronic devices can then extract time and location information from a GPS capable device and automatically enter the data without manual operation. Other electronic devices such as radios or stereo receivers may obtain location information that allows the electronic device to retrieve and display a menu of available radio stations and formats or automatically preset particular stations without manually scanning through to find the stations.

Appliances may also be able to make use of location information from GPS receivers. For example, as recipes are written with one set of instructions, it may be necessary to take the food out of the oven multiple times if the cooking times vary due to the location. Thus, conventional or microwave ovens may contain programs loaded in by the manufacturer that automatically alter particular cooking times to adjust for altitude or other factors when the location information is known. The oven may also automatically set the time on the display using the time information extracted from the GPS capable device. The term "appliance" as used herein refers to a household appliance such as a refrigerator, oven, coffee machine, dishwasher, clock radio, or stereo system but does not encompass a separate computer or computer peripheral. As used herein, the term "computer peripheral" is a printer, modem, or display to be used with a computer. The term "computer" as used herein is intended to refer to only processor-based machines colloquially described as desktop computers, laptop computers, or servers.

In another example, a dishwasher or washing machine can extract the location information to retrieve characteristics of the water supply (hardness/amount of particulate in the water, chemical content, etc.). The dishwasher or washing machine can have a preloaded program that varies the cycle times if the location is known due to differences in the water hardness. The water supply characteristics can be obtained from official municipal information sources and stored such that when the location information is supplied, the cycle times are automatically adjusted. Similarly, a coffee maker could make use of the water characteristics information to adjust brewing time for best flavor.

Figure 2:
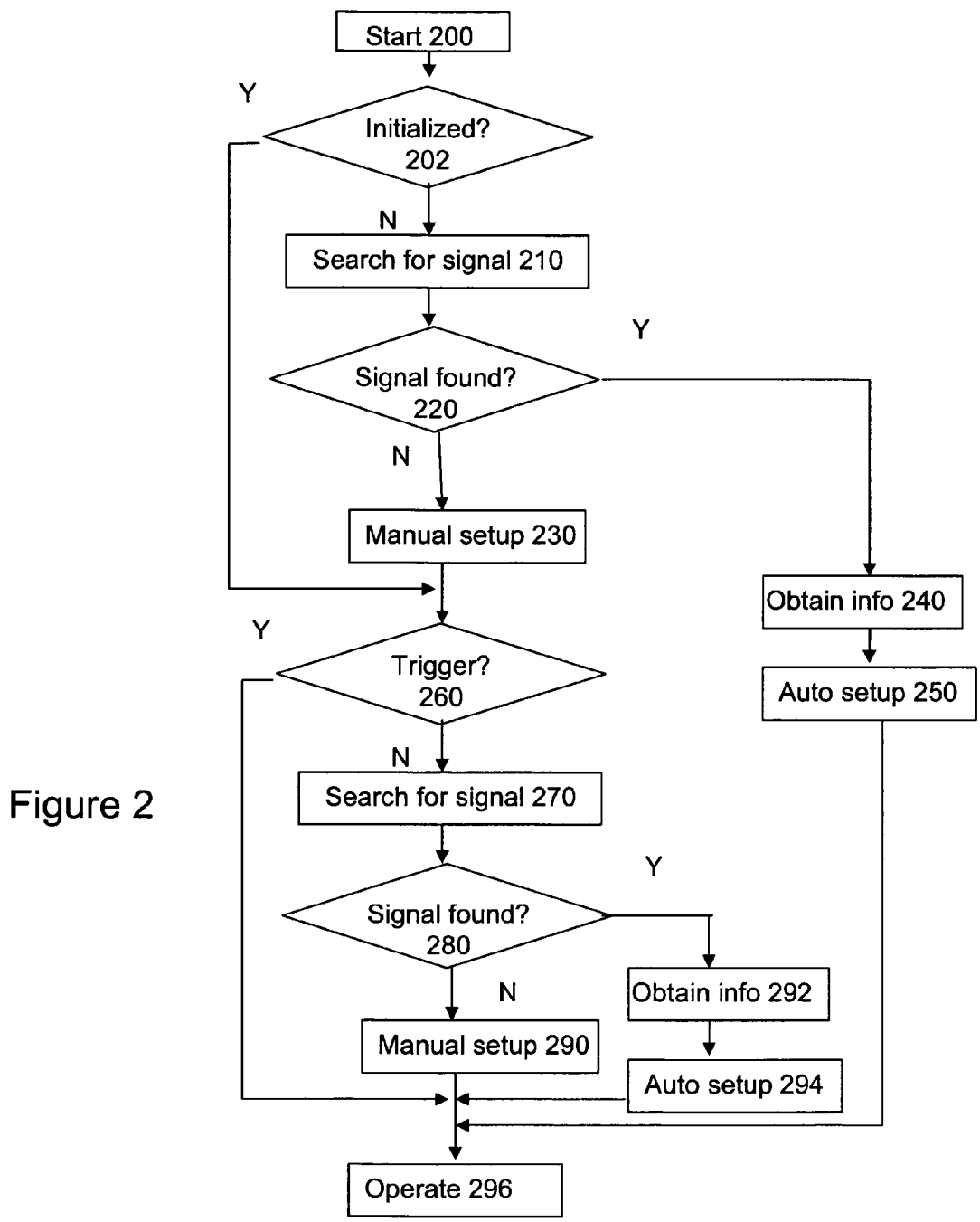
FIG. 2 is a flow chart illustrating location information procurement.

FIG. 2 is a flowchart of an operation of a parasitic interaction of one of the stationary devices with the mobile electronic device. At block 200, power is provided to the stationary device.

At block 202, the stationary device determines whether initialization has already been performed. If the stationary device determines that an initialization procedure is to be activated, the stationary device proceeds to block 210. The initialization procedure may be activated if the stationary device is in an initial state set by the manufacturer or if the power to the stationary device has been off for a predetermined amount of time.

In block 210, the stationary device searches for a wireless communication signal from an electronic device. The stationary device determines whether or not the signal is found at block 220.

If the stationary device determines that a signal is found, the stationary device obtains information from the electronic device at block 240. At block 250, the stationary device takes the location (and perhaps time) information obtained from the electronic device and automatically sets up for operation. The stationary device then visually or audibly indicates to an operator that setup is done and is ready to operate at block 296.

If a signal is not found, at block 230 the stationary device visually or audibly indicates to an operator to proceed with initial manual setup. After the operator has completed the initial manual setup, the stationary device looks for a trigger at block 260.

The trigger can be any internal or external event that directs the stationary device to search for a signal. Examples of internal events include a timer that causes activation after a predetermined period of time or at a predetermined time each day. Examples of external events include reception of a signal from any mobile electronic device, another stationary electronic device communicating with the stationary device, any device capable of communication with the stationary device, any device communicating with the stationary device using a specific protocol, or a control on the stationary device. Either an internal or external trigger may trigger a search for a mobile electronic device, as shown, or an external trigger may be used to immediately provide the protocol used to communicate with the mobile external device. One or more events alone or in combination may be used as a trigger. As indicated above, the protocol can be any IR or RF wireless protocol, such as Bluetooth, that enables communication to be achieved between devices.

The protocol is initiated using an exchange of messages called a handshake. The handshake may allow the devices to authenticate each other or provide for other security before other information is exchanged. After the handshake, communication is established between the devices.

At block 270, the stationary device searches for a wireless communication signal from an electronic device. The stationary device determines whether or not the signal is found at block 280.

If the stationary device determines that a signal is found, the stationary device obtains information from the electronic device at block 292. At block 294, the stationary device takes the information obtained from the electronic device and automatically sets up for operation using the location (and perhaps time) information. The stationary device then visually or audibly indicates to an operator at block 296 that the advanced setup is done and is ready to operate.

If a signal is not found at block 280, at block 290 the stationary device visually or audibly indicates to an operator to proceed with the advanced manual setup, if desired. After the operator has completed the advanced manual setup, at block 296 the stationary device then visually or audibly indicates to an operator that the advanced setup is done and is ready to operate. Either manual setup can be used to provide location information. In addition, a manual override may be present that permits the operator to override the location information received from the mobile device.

Figure 3:
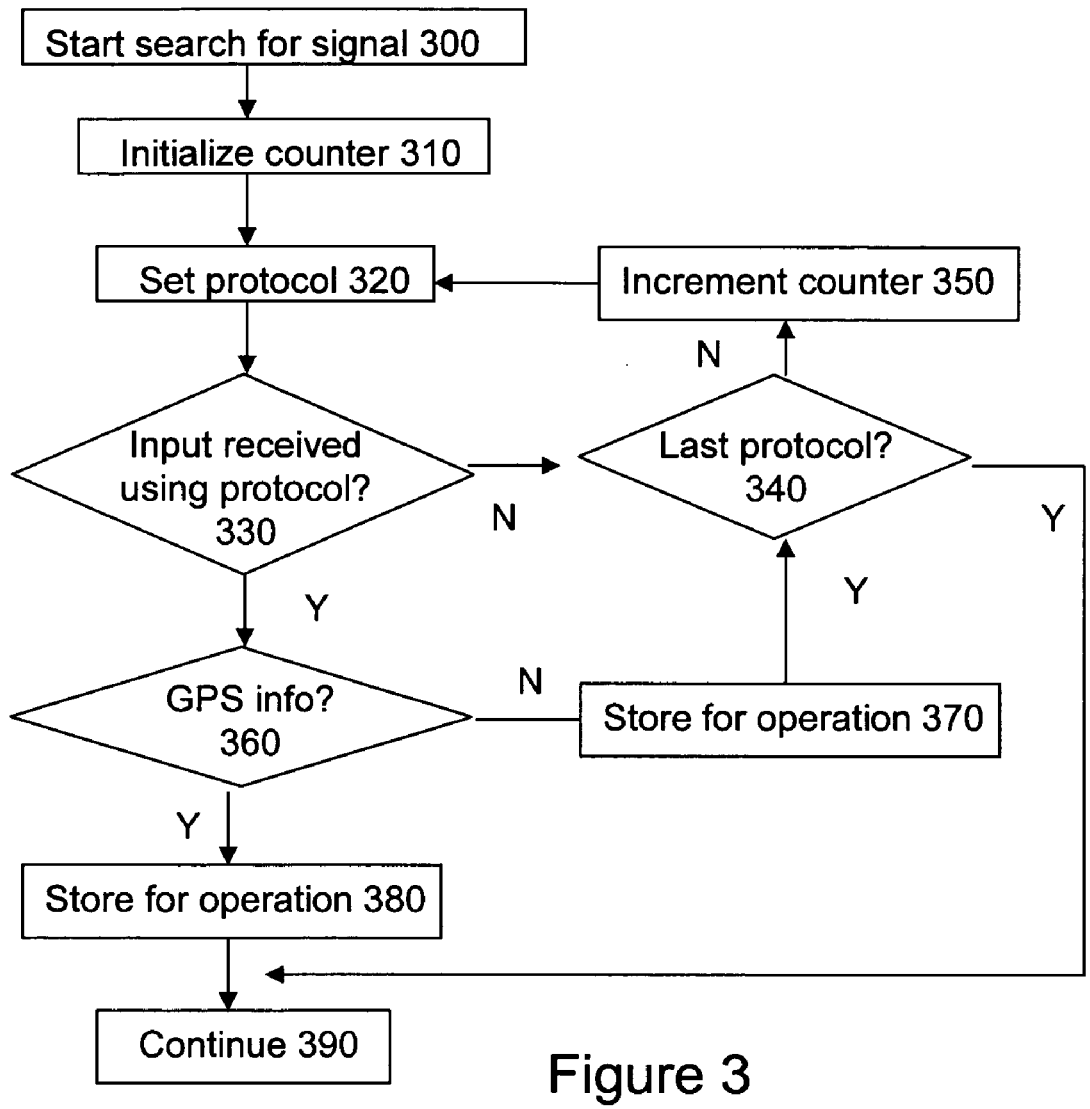
FIG. 3 is a flow chart illustrating searching for a signal.

The search for a signal, shown in blocks 210 and 270, is shown in more detail, in FIG. 3. At block 300, the stationary device starts the search for the signal 300. The stationary device first initializes a counter at block 310. Then, the stationary device sets the communication protocol to search for at block 320.

At block 330, the stationary device next determines whether a signal is received using the protocol set at block 320. If a signal is not found, the stationary device determines whether the last protocol has been reached at block 340. If the last protocol has not been reached, the stationary device increments the counter at block 350, and continues to cycle through protocols until a signal is found.

If a signal is found at block 330, the stationary device determines whether the signal contains GPS information, i.e. location and time information at block 360. If the signal does not contain GPS information but contains information to be used by the stationary device, the stationary device stores the information at block 370. The stationary device then determines whether the last protocol has been reached at block 340. If the last protocol has not been reached, the stationary device increments the counter at block 350, and continues to cycle through protocols until another signal is found.

If a signal containing GPS information is found at block 360, the information is stored at block 380. The method then continues at block 390 as shown in FIG. 2.

Figure 4:
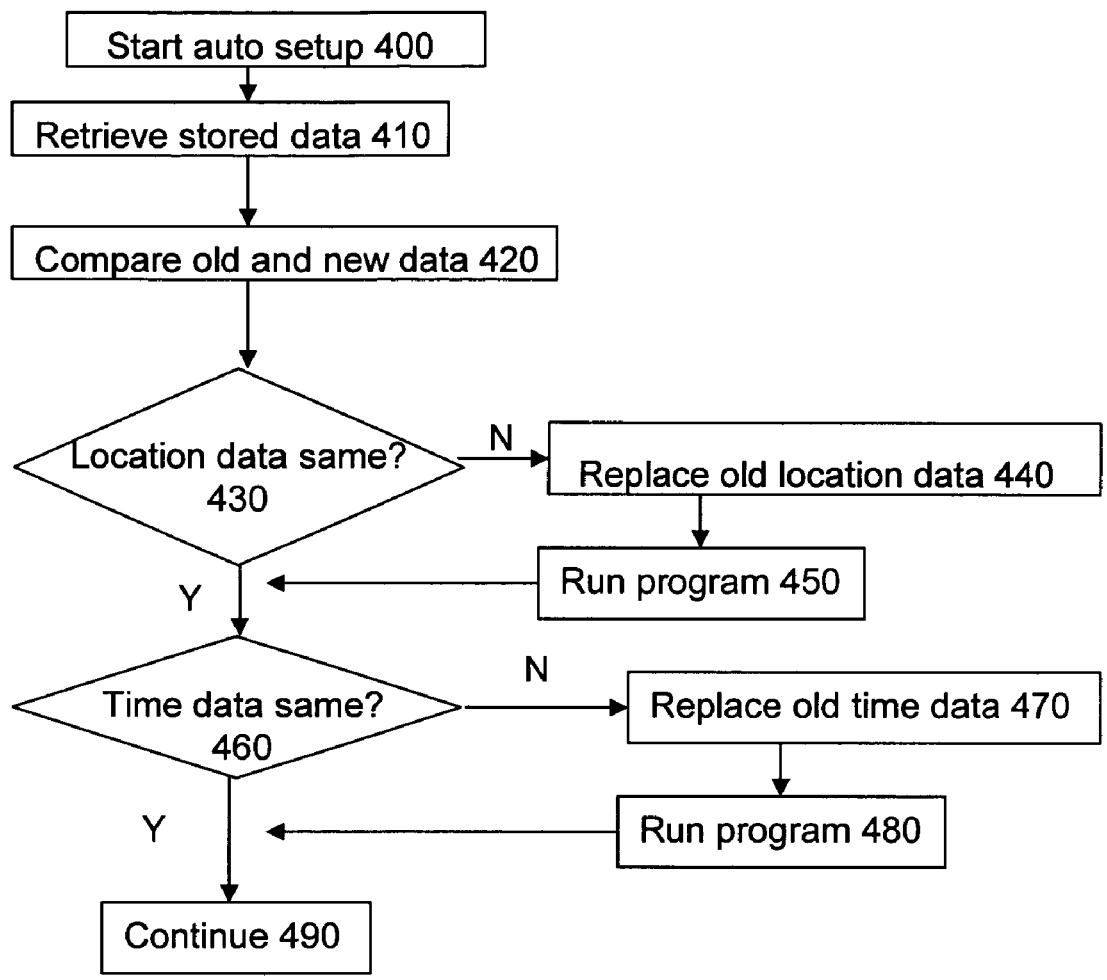
FIG. 4 is a flow chart illustrating automatic setting of the device.

The process for automatically setting the stationary device at block 294 is shown in more detail in the flowchart of FIG. 4. As shown in FIG. 4, the automatic setup starts at block 400. The stationary device retrieves stored data at block 410. The stored data contains old location and time data that has been used by the stationary device and new location and time data received from the mobile electronic device. The time data also may also include data about the day, month and year.

At block 420, the old data and new data are compared and at block 430 the stationary device determines whether the location data of both the old data and the new data are the same.

If the location data are not the same, the stationary device replaces the old location data used to operate the stationary device with the new location data obtained from the mobile electronic device at block 440 and reruns an internal program to reset the operation at block 450.

After the internal program is run at block 450, the stationary device determines whether new time data is the same as the old time data at block 460. In addition, if the location data are the same at block 430, the stationary device also determines whether new time data is the same as the old time data at block 460.

If the time data are not the same, within a predetermined amount of time, the stationary device replaces the old time data used to operate the stationary device with the new time data obtained from the mobile electronic device at block 470. The stationary device then reruns an internal program to reset the operation at block 480, if desired. The predetermined amount of time can be any amount of time, for example from a second to a day or longer.

If the time data are the same at block 460 or after the program is run at block 480, the program continues at block 490 as shown in FIG. 2.

For the automatic setup block at 250, the new location and time data merely overwrites the information stored in the location used to provide the information as any information stored from initialization may be random.

As an example of the above method, a person has a GPS equipped cell phone that constantly receives GPS signals and updates its stored location information. The person purchases a new stereo system and takes it to their apartment building. Alternatively, the person receives a stereo system they ordered via UPS. When the person enters their apartment building, the cell phone stops receiving GPS signals due to poor reception, but retains the last location information it received. In the apartment, the person unpacks the new stereo, connects it to other entertainment components, plugs the power cord in and turns it on. The new stereo includes the parasitic GPS capability, that is, it contains logic programming that runs the above blocks. The stereo detects the cell phone, which has GPS capability. The stereo retrieves location information stored in the cell phone and uses the location information along with station line-up information obtained in some other fashion, to display a menu of stations available for reception in the area. Thus, the stereo does not need a large GPS antenna to operate indoors, but can still provide the benefits of automatically determining its location as if it were equipped with GPS. In addition, the location of the stereo is generally determined if the GPS capable device is unable to receive inside the building, rather than the specific location within the building.

As indicated, it will be understood that the present invention comprises a logic program product for executing logic instructions stored in a readable medium that when executed cause the stationary device to execute the various steps of embodiments of the method of the invention.

It will therefore be understood that reference to method steps made herein in regards to invention method embodiments are likewise intended to refer to stationary device actions that occur as a result of the stationary device executing readable logic instructions of a logic program embodiment of the invention.

Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The usable medium that the executable logic instructions of the program product are embedded within may comprise any of a number of means for storing executable logic instructions. The instructions thus form one or more routines that are executable to permit the device to operate in a desired manner. The software implementations are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories; or a signal containing logic instructions being sent in a network environment. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for transmission represents examples of the state of the art. Such standards are periodically superseded by faster or more efficient equivalents having essentially the same functions. Accordingly, replacement standards and protocols having the same functions are considered equivalents.

Embodiments have been presented in which a stationary device that does not have GPS capability receives location and time information from a mobile, GPS capable device using a non-GPS wireless protocol. This permits the stationary device to make use of the location information in combination with other information from the stationary device, communicated from the mobile device and/or communicated from other devices in a network of devices connected to the stationary device, to customize features of the stationary device accordingly. The stationary device is activated through an external trigger or automatically through an internal trigger.

While the invention has been described above by reference to various embodiments, it will be understood that many changes and modifications can be made without departing from the scope of the invention. It is therefore intended that the foregoing detailed description be understood as an illustration of the presently preferred embodiments of the invention, and not as a definition of the invention. It is only the following claims, including all equivalents, which are intended to define the scope of this invention.

We claim:

1. An electronic device comprising:
    a first module configured to communicate with an external source;
    a second module configured to communicate wirelessly with a mobile device, wherein the mobile device contains location information;
    a third module configured to:
        receive location information provided by the mobile device; and
        generate customized location information based on information received from the external source and the location information received from the mobile device;
    a fourth module configured to provide the customized location information to a display; and
    wherein the electronic device is a stationary device and wherein the first, second, third and fourth modules are within the stationary device.

2. The device of claim 1, wherein the stationary device is a set-top box.

3. The device of claim 1, wherein the external source is a cable TV network, a satellite TV network, or an Internet Protocol TV system.

4. The device of claim 1, wherein the second module is further configured to communicate with the mobile device when a trigger occurs.

5. The device of claim 1, wherein the second module is further configured to cycle through different communication protocols in an attempt to communicate wirelessly with the mobile device.

6. The device of claim 1, wherein the third module is further configured to utilize time information received from the mobile device to generate the customized location information.

7. An electronic device comprising:
- a first module comprising an information table, wherein the information table includes information indexed by location;
- a second module configured to wirelessly communicate with a mobile device containing location information;
- a third module configured to generate customize location information as a function of location information provided by the mobile device and information received from the information table;
- a fourth module configured to control a stationary device function in response to the customized location information;
- a fifth module configured to indicate a customized location information status; and
- wherein the electronic device is a stationary device and wherein each of the modules are within the stationary device.

8. An appliance comprising:
- a first module configured to communicate to an external source;
- a second module configured to wirelessly communicate with a mobile device containing location information;
- a third module configured to:
  - receive location information provided by the mobile device; and
  - generate customized location information based on information received from the external source and the location information received from the mobile device;
- a fourth module configured to control an appliance function in response to the customized location information; and
- wherein the appliance is a stationary set-top box and each of the modules are contained within the stationary set-top box.

9. The appliance of claim 8, wherein the second module is further configured to communicate with the mobile device when a trigger occurs.

10. The appliance of claim 8, wherein the second module is further configured to cycle through different communication protocols in an attempt to communicate wirelessly with the mobile device.

11. The appliance of claim 8, wherein the third module is further configured to utilize time information received from the mobile device to generate the customized location information.

* * * * *